United States Patent
Ripley et al.

(10) Patent No.: US 6,453,021 B1
(45) Date of Patent: Sep. 17, 2002

(54) PUBLIC DISPLAY VOICE MAIL SYSTEM

(76) Inventors: Robert L. Ripley, 31 Brittany Dr., Cary, IL (US) 60013; Craig Courter, 9404 Abiento Pl., La Mesa, CA (US) 91941

( * ) Notice: Subject to any disclaimer, the term of this patent is extended or adjusted under 35 U.S.C. 154(b) by 0 days.

(21) Appl. No.: 09/192,396

(22) Filed: Nov. 13, 1998

(51) Int. Cl.[7] .............................................. H04M 1/64
(52) U.S. Cl. ................ 379/88.11; 379/67.1; 379/88.12; 379/88.14; 379/88.22; 379/93.17
(58) Field of Search .......................... 379/88.11, 93.17, 379/93.23, 67.1, 68, 70, 88.12, 88.13, 88.14, 88.19, 88.26, 88.22

(56) References Cited

U.S. PATENT DOCUMENTS

| | | | |
|---|---|---|---|
| 4,805,207 A | 2/1989 | McNutt et al. | 379/88.25 |
| 4,853,952 A | 8/1989 | Jachmann et al. | 379/88.11 |
| 4,885,763 A * | 12/1989 | O'Brien et al. | 379/88.22 |
| 5,003,577 A | 3/1991 | Ertz et al. | 379/88.13 |
| 5,349,636 A | 9/1994 | Irribarren | 379/88.15 |
| 5,463,676 A * | 10/1995 | Ohsawa | 379/88.11 |
| 5,530,740 A | 6/1996 | Irribarren et al. | 379/88.17 |
| 5,557,659 A | 9/1996 | Hyde-Thomson | 379/88.13 |
| 5,568,540 A | 10/1996 | Greco et al. | 379/88.25 |
| 5,581,604 A | 12/1996 | Robinson et al. | 379/88.15 |
| 5,633,916 A | 5/1997 | Goldhagen et al. | 379/88.17 |
| 5,657,376 A | 8/1997 | Espeut et al. | 379/88.17 |
| 5,666,401 A | 9/1997 | Morganstein et al. | 379/67.1 |
| 5,748,709 A * | 5/1998 | Sheerin | 379/88.24 |
| 5,815,552 A * | 9/1998 | Ohtsuka | 379/88.11 |
| 6,208,642 B1 * | 3/2001 | Balachandran et al. | 370/385 |

* cited by examiner

*Primary Examiner*—Allan Hoosain
*Assistant Examiner*—Ovidio Escalante
(74) *Attorney, Agent, or Firm*—William K. Baxter; Godfrey & Kahn, S.C.

(57) ABSTRACT

A voice mail messaging display system having a means for receiving telephone calls, and a data processor or computer coupled to the means for receiving telephone calls. The computer has a memory storing a voice mail program and a message board program. The voice mail program answers the telephone calls received by the means for receiving telephone calls and generates message records of the telephone calls. The message board program uses the message records and generates a display signal based on the message records. A signal conversion mechanism is coupled to the data processor and converts the display signal to a desired format. The converted display signal is delivered to at least one display device positioned in an area where a large number of people may see the display. Any person who is a subscriber of the system may review the display to determine if he or she has received any messages and, if so, may then dial into the computer to retrieve his or her messages.

10 Claims, 4 Drawing Sheets

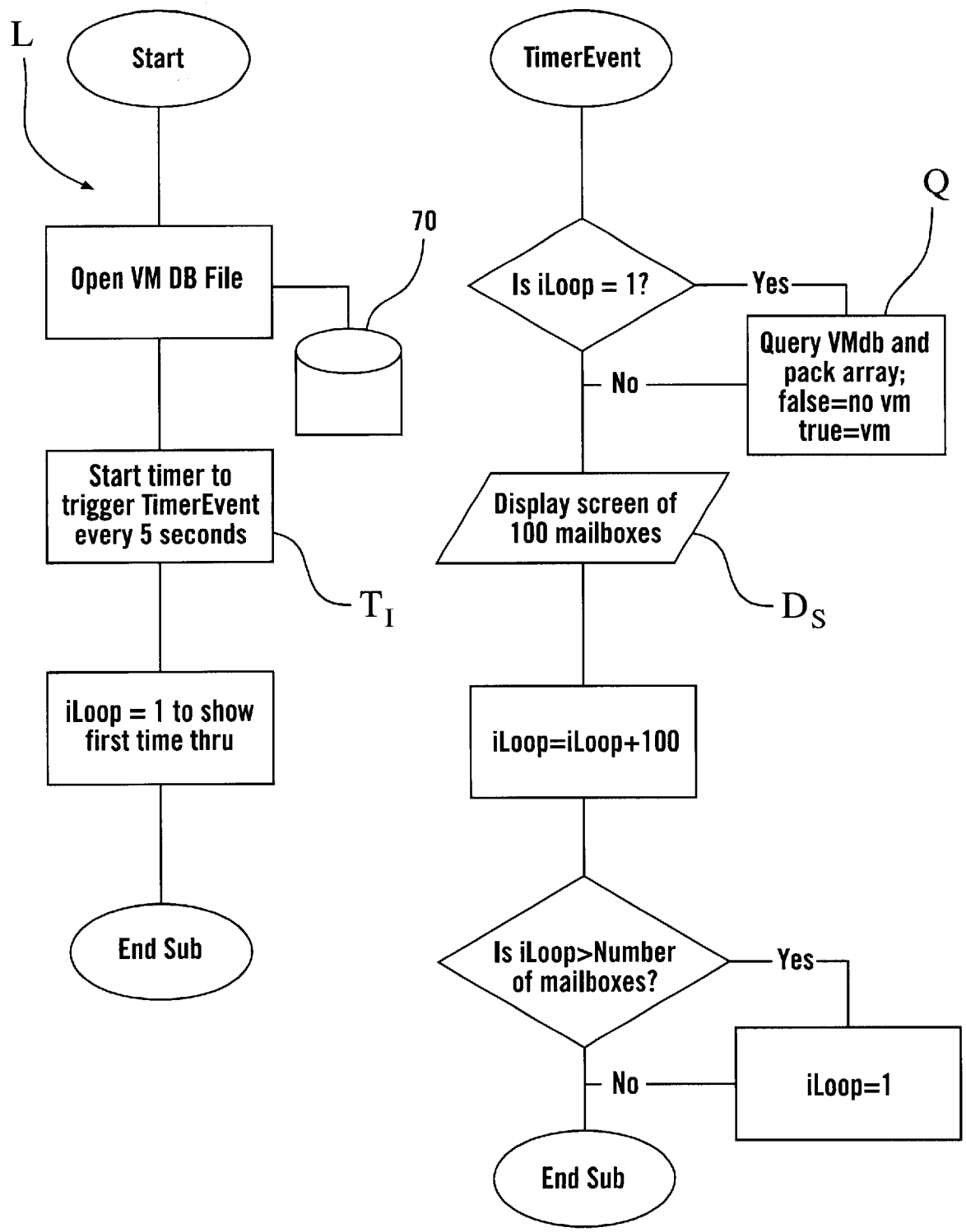
*FIG. 3*   *FIG. 4*

PUBLIC DISPLAY VOICE MAIL SYSTEM

FIELD OF THE INVENTION

The present invention relates to telephone answering systems. More particularly, the present invention relates to a voice mail system designed to be used in an environment where most of the individuals using the systems do not have private offices or cubicles with individual telephones.

BACKGROUND OF THE INVENTION

Present voice mail systems, such as the Audix™ voice mail system, are designed for use in offices and other environments where every subscriber or individual on the system has access to their own telephone extension. However, in many places, particularly factories, schools, hospitals, and similar places of business, employees do not have private offices and individual telephones. Thus, voice mail conveniences have not been made available to such employees. Nevertheless, these employees may receive telephone calls at work. In many facilities, if an emergency call is made to an employee lacking a personal telephone, the employee is brought from his or her workstation to the closest telephone to take the call. However, employers generally discourage most other personal telephone calls and if non-emergency calls are made to an employee, there may or may not be a system for answering such calls. If there is, it is likely to be a labor-intensive, manual system based on message notes and there is generally no guarantee that an employee will receive a message concerning a non-emergency matter.

In today's society it has become increasingly difficult to prevent employees from receiving non-emergency, personal phone calls, and the number of such calls has generally increased. Answering these calls and forwarding messages to employees can be very difficult in large facilities and usually interrupts the work efforts of the employee receiving the call and others in the facility. A reliable messaging system that permitted employees to receive messages, displayed information indicating that calls had been received, and then permitted employees to retrieve the messages during a non-interruptive period such as lunch and other breaks, would permit family members, medical care providers, and others to communicate with employees in a non-intrusive manner, without causing unnecessary interruptions in the work place.

OBJECTS AND SUMMARY OF THE INVENTION

Therefore, it is an object of the present invention to provide an improved voice mail message system.

It is another object of the present invention to provide a voice mail message system with a public display so that employees in large facilities lacking personal phone extensions can determine whether they have received telephone calls, and respond to those calls at a non-interruptive time.

These and other objects are achieved in a voice mail system that includes a computer configured to answer incoming telephone calls and ask callers to leave messages for specific users, according to a set of user-assigned IDs or mailbox numbers. The software loaded on the computer sifts through the record of received messages to determine which users or subscribers have voice mail messages. The computer then generates an output that indicates which subscribers have messages and the output is transmitted to one or more display devices in the system. At a convenient time, any subscriber may review the display on the display devices to determine if he or she has received any messages and, if so, may then dial into the computer to retrieve his or her messages.

An important aspect of the invention is the display of multiple subscriber information on each monitor or output device. Information displayed on each monitor is periodically scrolled and updated so that information for a large number of subscribers ID's can be displayed and multiple subscribers can view a single monitor and individually determine whether they have messages waiting to be retrieved from the system.

These are just some of the features and advantages of the present invention. Many others will become apparent by reference to the detailed description of the invention taken in combination with the accompanying drawings.

BRIEF DESCRIPTION OF THE DRAWINGS

In the drawings:

FIG. 3 is a flow chart of the software used to monitor the voice mail database and send updated information to the monitors in the voice mail system.

FIG. 4 is a flowchart of the timer event interrupt in the software used to monitor the voice mail database.

DETAILED DESCRIPTION

Figure 1:
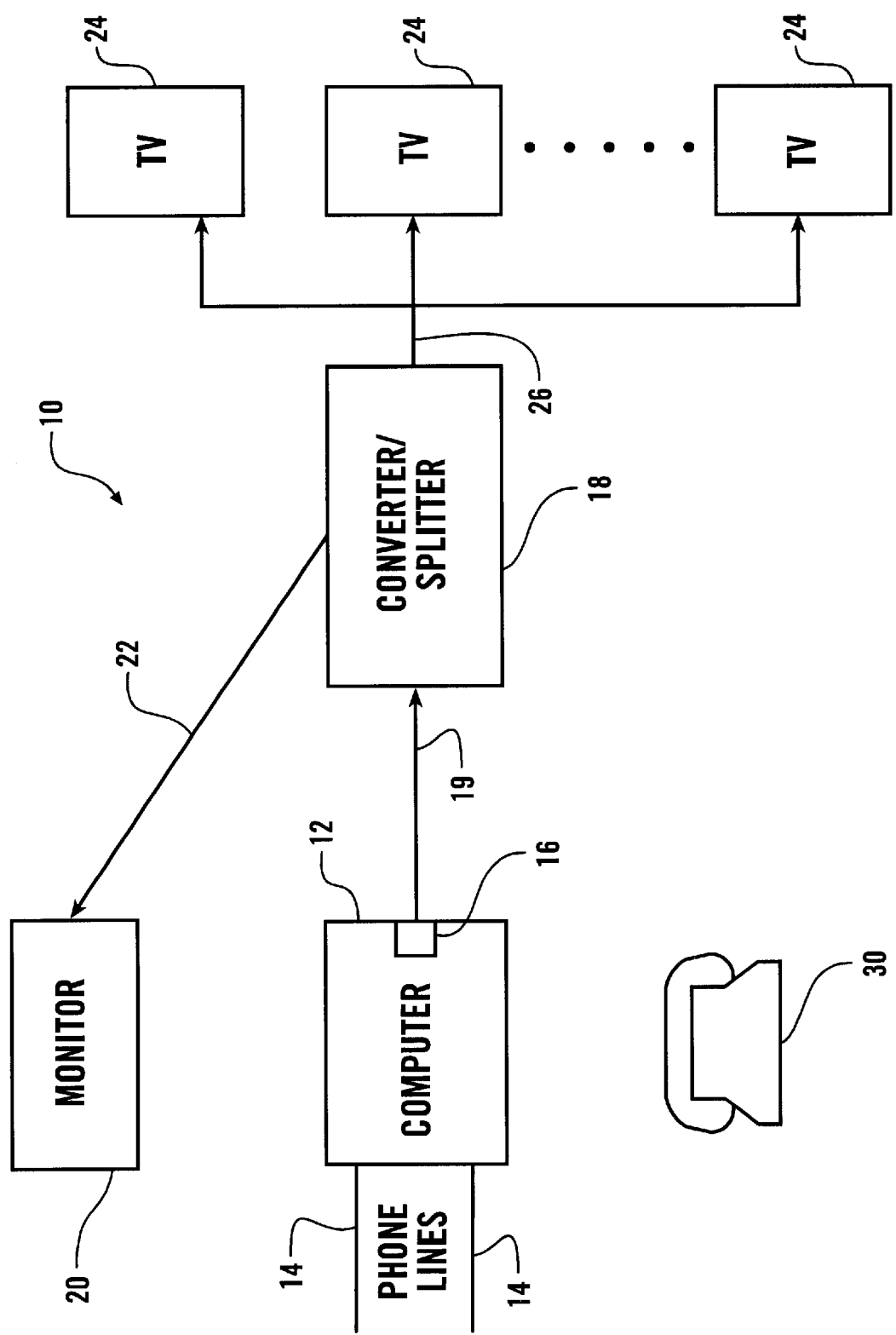
FIG. 1 is a schematic diagram of a voice mail system of the present invention.

A voice mail message system 10 constructed according to the teachings of the present invention is shown schematically in FIG. 1. The system 10 includes a computer 12 coupled to one or more incoming telephone lines 14. As will be discussed in greater detail below, calls received by the computer 12 are processed and a message information signal (not shown) is delivered through a video output 16 of the computer 12 to a signal converter/splitter 18 via a communications link 19. The signal converter/splitter 18 splits the message information signal into first and second sub-signals. The first sub-signal is output to a display device 20, such as a standard VGA monitor, via a communications link 22. The display device 20 may be used by a system manager. The second sub-signal is sent to one or more display devices 24 via a communications link 26. In one form of the invention, the display devices 24 are television sets and the sub-signal is converted to an NTSC signal or signals by the signal converter/splitter before being transmitted to the display devices 24. Preferably, the display devices 24 are located in public places such as lunch, locker, or break rooms where employees may view them during break times away from production and work areas. Further, one or more telephones 30 may be located in such non-work areas so that employees may access the system 10 if they determine that messages have been left in the system for them.

Figure 2:
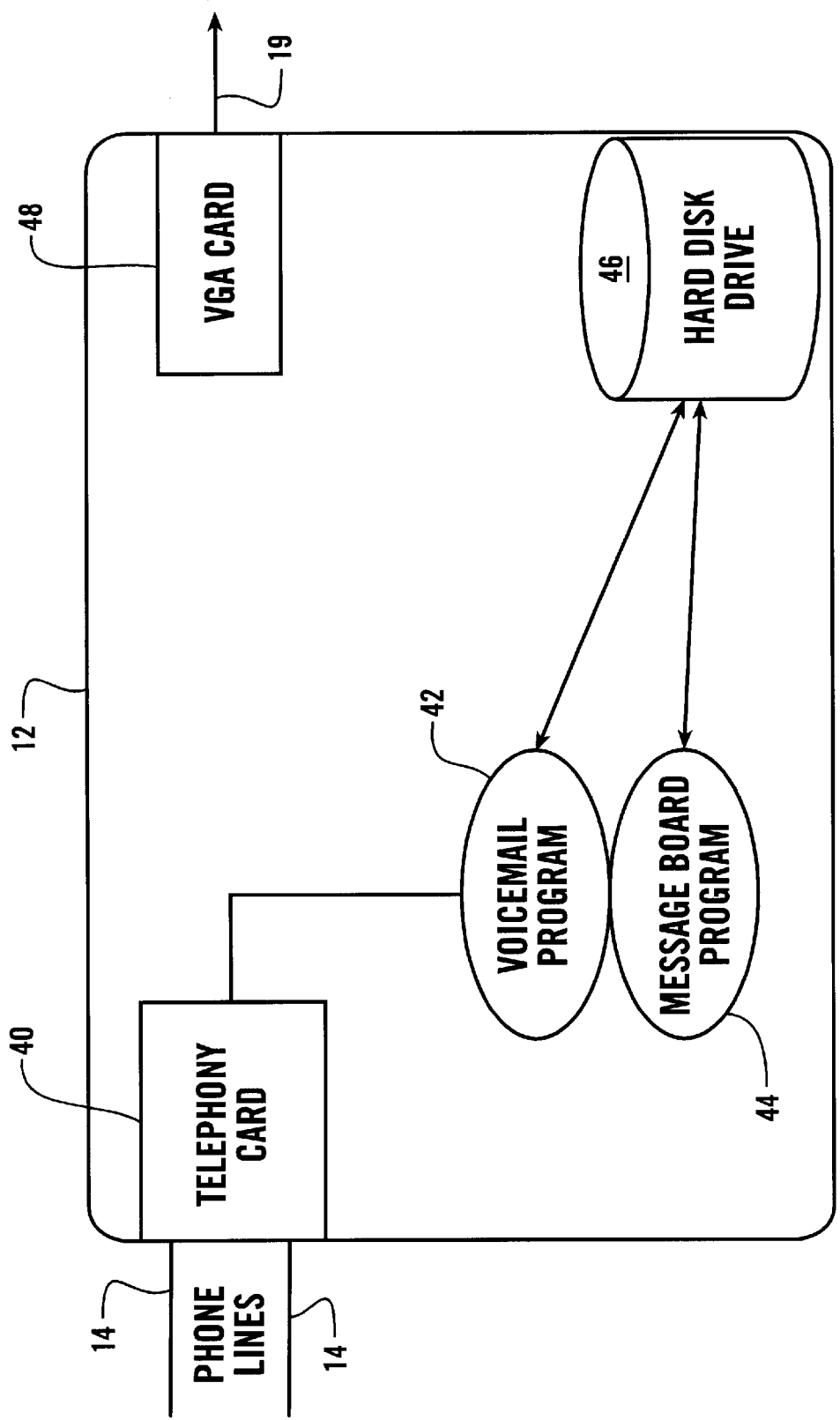
FIG. 2 is a more detailed schematic diagram of the main computer shown in FIG. 1.

As best seen by reference to FIG. 2, the computer 12 preferably includes a telephony card 40, which is coupled to the incoming telephone lines 14, a voice mail program 42 stored in memory, a message board program 44 also stored in memory, and additional available memory space on a storage device such as a disk drive 46. The telephony card 40 may be a card manufactured by Dialogic under the name Dialog/4. The voice mail program 42 may be one of many commercially available programs. However, the Small Business Assistant software (version 1.5x for Windows) from Telephony Experts was found to be particularly well suited for use in the present invention. The function of the voice mail program 42 is to receive and process calls. The message board program 44 delivers message information to the operating system running on the computer 12 which controls a video card 48. The video card 48, which is preferably a VGA card, outputs display information through the communications links 19 and 22 to the display devices 20 and 24. The computer 12 multi-tasks between the standard voice mail program 42 and the message board program 44.

More specifically, the standard voice mail program 42 receives calls through the telephone lines 14 and telephony card 40, determines that a caller wishes to leave a voice mail message, and determines which mailbox the voice mail message should be delivered to. The voice mail program 42 then records the call in digital form on the disk drive 46 of the computer 12, and maintains a record (i.e., a remembrance) that a voice mail message has been received and is waiting to be opened or retrieved by one of the system's subscribers. The record can be maintained in various ways depending on the particular voice mail program 42 used in the system 10. For example, the voice mail program 42 may store information about a particular call in file including the mailbox number of a subscriber and the message status. Alternatively, information regarding a call may be maintained in a conventional data base 70, such as a Paradox database.

As alluded to above, each of the subscribers using the system is assigned a mailbox, usually by number. An individual subscriber can call into the computer 12 through the telephone lines 14 and access his or her mailbox, which is maintained by the voice mail program 42. Using a sequence of menu choices provided by the voice mail program 42, a single subscriber can chose to listen to any voice mail messages associated with his or her voice mailbox. After the subscriber listens to a message, the voice mail system 10 modifies the record related to that message by indicating that the message has been listened to, deleted, or both, as the case may be.

As noted above, the message board program 44 runs in a multi-tasking environment on the computer 12 with the voice mail program 42. However, the message board program 44 could be implemented as a part of the voice mail program 42. Regardless of how the message board program 44 is implemented, it is designed to scan the message records of the voice mail program 42, such as by scanning them, and to modify the display on the display devices 20 and 24 to indicate whether a particular mailbox has unopened voice mail messages.

Figure 5:
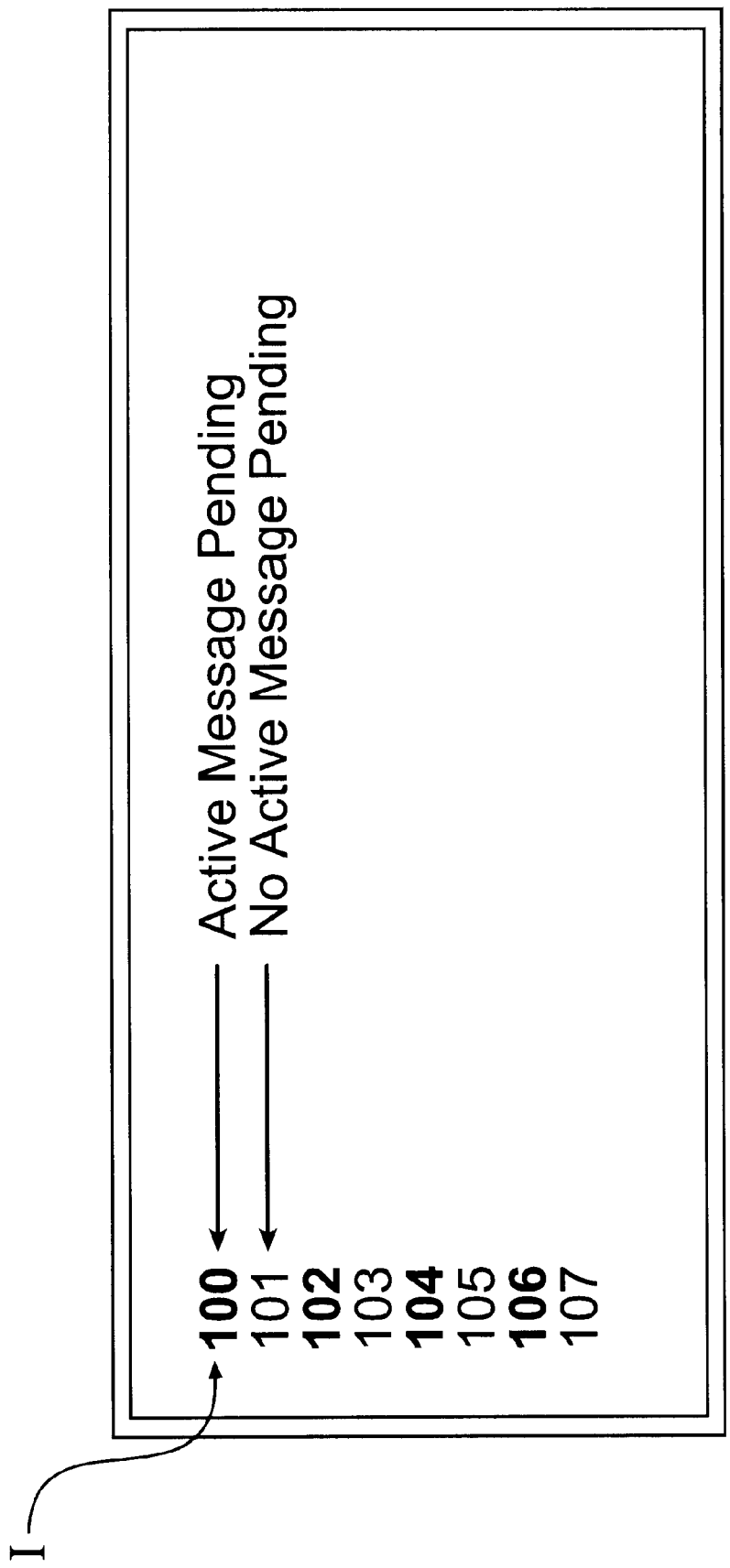
FIG. 5 is an illustration of a monitor screen displaying telephone messages for subscribers of the voice mail system.

By way of example, when the voice mail program 42 maintains the database 70 (FIG. 3) of message information, the message board program 44 scans through the database 70 to determine which mailbox contains unopened messages (see FIGS. 3 and 4). Specifically, the message board program 44 functions using an event-oriented approach. The message board program 44 uses a timing loop L which triggers a periodic timing interrupt $T_1$, which may occur every five seconds. The first time through the loop L (which is also the first time through the timing interrupt $T_1$) the program queries (at Q) the voice mail database 70 generated by the voice mail software 42 to determine which mailboxes have current messages. When a mailbox has an unopened message, the message board software 44 sets an internal element to indicate that the mailbox being reviewed has a current message. The message board program 44 then displays a first series of mailboxes at $D_s$ in a predetermined group, such as 100 mailboxes, on the display devices 20 and 24. Each successive time through the loop L, the message board software 44 simply displays the next series of mailboxes on the display devices 20 and 24 until all of the mailboxes have been displayed. The cycle then repeats itself, thereby constantly updating the information displayed on the display devices 20 and 24. The display on the display devices 20 and 24 is designed as a series of pages. Each page contains one or more mailbox identifiers (generally numbers) I for the subscribers to the system 10. When a message is pending for a particular subscriber, that subscriber's identifier I is displayed in dark bold type or other identifying type or marks (see FIG. 5). When no message is pending for a particular identifier, that identifier is displayed in light type or other type or marks that contrast the message present type (see FIG. 5). Alternatively, only those identifiers I for mailboxes having messages could be displayed.

Thus, the system 10 provides a voice mail system that answers incoming telephone calls and, determines which subscribers of the system have voice mail messages. The system then generates an output that provides notification information by indicating which subscribers have messages and the output is transmitted to one or more display devices in the system. At a convenient time, any subscriber may review the display on the display devices to determine if he or she has received any messages and, if so, may then dial into the computer to retrieve his or her messages.

While the present invention has been described in what is believed to be the most preferred forms, it is to be understood that the invention is not confined to the particular examples and arrangement of the components herein illustrated and described, but embraces such modified forms thereof as come within the scope of the appended claims.

What is claimed is:

1. A voice mail messaging display system comprising:
    a telephony mechanism for receiving telephone calls;
    a data processor coupled to the telephony mechanism and having memory storing a voice mail program and a message board program, the voice mail program for answering the telephone calls received by the telephony mechanism and generating message records of the telephone calls, the message board program for scanning the message records and generating a display signal based on the message records, the display signal carrying voice mail information in the form of unique mailbox identifiers for each of the multiple subscribers;
    a signal splitting mechanism coupled to the data processor for splitting the display signal into a first sub-signal and a second sub-signal;
    a first display device coupled to the signal splitting mechanism to receive the first sub-signal;
    at least one second display device coupled to the signal splitting mechanism to receive the second sub-signal; and
    wherein the first sub-signal is a VGA signal and the second sub-signal is a NTSC signal.

2. A voice mail message display system for displaying notification information for multiple subscribers having no personal telephones with individual voice mail messaging systems, the voice mail message system having a computer, the computer having a memory and a telephony mechanism for receiving telephone calls for the multiple subscribers, the system comprising:
    a voice mail program and a message board program stored in the memory, the voice mail program for answering the telephone calls received by the telephony mechanism and generating message records of the telephone calls for a plurality of voice mailboxes, the message board program for scanning the message records and generating a display signal based on the message records, the display signal carrying voice mail information including unique mailbox identifiers for the plurality of voice mailboxes of each of the multiple subscribers; and a plurality of display devices coupled to the computer for receiving the display signal, and for displaying the unique mailbox identifiers for the plurality of voice mailboxes of the multiple subscribers, wherein one or more of the unique mailbox identifiers are highlighted to indicate the presence of at least one voice mail message for one or more of the multiple subscribers.

3. A voice mail messaging display system as in claim 2, wherein the message records are stored in the form of a database.

4. A voice mail messaging display system for multiple subscribers having no personal telephones with individual voice mail messaging systems, the voice mail messaging display system comprising:

a telephony mechanism for receiving telephone calls for the multiple subscribers;

a computer coupled to the telephony mechanism and having memory storing a voice mail program and a message board program, the voice mail program for answering the telephone calls received by the telephony mechanism and generating message records of the telephone calls, the message board program for scanning the message records and generating a display signal based on the message records, the display signal carrying voice mail information including unique mailbox identifiers for each of the multiple subscribers;

a signal conversion mechanism coupled to the computer for converting the display signal to a desired format; and at least one display device coupled to the signal conversion mechanism for displaying the unique mailbox identifiers of each of the multiple subscribers, wherein one or more of the unique mailbox identifiers are highlighted to indicate the presence of at least one voice mail message for one or more of the multiple subscribers.

5. A voice mail messaging display system as in claim 1, wherein the message records are stored in the form of a database.

6. A voice mail messaging display system as in claim 4, wherein the unique mailbox identifiers are identification numbers assigned to each of the multiple subscribers.

7. A voice mail messaging display system as in claim 4, wherein the unique mailbox identifiers are the names of each of the multiple subscribers.

8. A voice mail messaging display system for multiple subscribers having no personal telephones with individual voice mail messaging systems, the voice mail messaging display system comprising:

a telephony mechanism for receiving telephone calls;

a computer coupled to the telephony mechanism and having memory storing a voice mail program and a message board program, the voice mail program for answering the telephone calls received by the telephony mechanism and generating message records of the telephone calls, the message board program for scanning the message records and generating a display signal based on the message records, the display signal carrying voice mail information including unique mailbox identifiers for each of the multiple subscribers;

a signal splitting and conversion mechanism coupled to the computer for splitting the display signal into a first sub-signal and a second sub-signal, and converting the first sub-signal into a first display format and converting the second sub-signal into a second display format, the second display format being different from the first display format;

a first display device coupled to the signal splitting and conversion mechanism to receive the first sub-signal and for displaying the unique mailbox identifiers of each of the multiple subscribers; and at least one second display device coupled to the signal splitting and conversion mechanism to receive the second sub-signal and for displaying the unique mailbox identifiers of each of the multiple subscribers.

9. A voice mail messaging display system as in claim 8, wherein the message records are stored in the form of a database.

10. A voice mail message display system as in claim 8, wherein one or more of the unique mailbox identifiers are highlighted to indicate the presence of at least one voice mail message for one or more of the multiple subscribers in the system.

* * * * *